Patented Apr. 8, 1941

2,238,020

UNITED STATES PATENT OFFICE 2,238,020

VINYLIDENE CHLORIDE COPOLYMER

Alden W. Hanson and William C. Goggin, Midland, Mich., assignors to The Dow Chemical Company, Midland, Mich., a corporation of Michigan No Drawing. Application June 2, 1939, Serial No. 277,055

5 Claims. (Cl. 260—84)

This invention relates to copolymers of vinylidene chloride and vinyl cyanide or alpha-lower alkyl derivatives of vinyl cyanide. Such compounds have the general formula

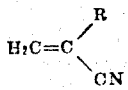

where R is hydrogen or a lower alkyl group containing from 1 to 5 carbon atoms inclusive.

Copolymers of vinylidene chloride have been made heretofore with a wide range of copolymerizing compounds, and exhibit a wide range of physical properties. In many cases the copolymer has a lower softening point than has polymeric vinylidene chloride alone, and hence is more easily deformed plastically to give shaped articles. Such softening point lowering is generally accompanied, in vinylidene chloride copolymers, by other softness characteristics, and quite commonly by lowering of tensile strength, toughness, and dielectric strength to too great an extent. It is desired to produce a tough plastic having good tensile strength and good dielectric strength. It is also desirable to produce a plastic having high strength and hardness values, coupled with toughness.

It is accordingly an object of the present invention to provide a polymeric plastic which has to a practical degree at least a plurality of the properties of toughness, hardness, dielectric strength, and tensile strength. It is another object to provide a vinylidene chloride copolymer which has a lower softening point than vinylidene chloride alone and which has at least a plurality of the properties of toughness, hardness, dielectric strength and tensile strength with values higher than those generally encountered for these combinations of properties in most polymeric plastics. It is a further object to provide new and useful copolymers of vinylidene chloride and vinyl cyanide or alpha-alkyl derivatives of vinyl cyanide.

It has now been found that the foregoing objects may be attained, and useful copolymers produced having an unusual combination of toughness, hardness, dielectric and tensile values, by polymerizing together vinylidene chloride and vinyl cyanide or alpha-alkyl derivatives thereof, to produce copolymers having from about 5 to about 95 per cent of the vinyl cyanide compound copolymerized with correspondingly from 95 to 5 per cent of vinylidene chloride. The polymerization may be effected at temperatures ranging from about room temperature up to about 90° C. under the vapor pressure of the reactants. A convenient temperature range is from 30° to 60° C. The polymerization rate can be accelerated by carying out the reaction in the presence of catalysts such as benzoyl peroxide, hydrogen peroxide or uranium salts as catalysts, or by subjecting the copolymerizing mixture to the effects of light, or to the combined effects of light, catalyst and heat.

The polymer of vinylidene chloride alone has a softening point near 210° C., and that of vinyl cyanide softens near 215° C., while copolymers of the two soften at temperatures low enough so that they may be molded conveniently at 160°–190° C. For example, the copolymer of 95 per cent vinyl cyanide and 5 per cent vinylidene chloride softens at about 188° C., and that of 5 per cent vinyl cyanide and 95 per cent vinylidene chloride softens at about 190° C. The copolymers intermediate between those defined above have still lower softening points, and can be molded at temperatures generally below 180° C.

The following examples illustrate the practice of the invention:

Example 1

75 parts by weight of monomeric vinylidene chloride, boiling between 31°–32° C. and 25 parts by weight of monomeric vinyl cyanide, boiling between 76°–77° C., were mixed. To the mixture of monomers was added 0.5 per cent by weight of benzoyl peroxide as catalyst. The mixture was sealed in a pressure vessel and subjected to a temperature of about 45° C. for 11 days. The polymeric product obtained was a light yellow, nearly transparent glassy mass after it had been dried to remove traces of remaining monomers. Portions of the polymeric product were molded at 170° C. to form test specimens. The product had a Shore hardness of 87, a tensile strength of 10,500 pounds per square inch of original cross section and an impact strength of 3.4 inch pounds.

Example 2

In a manner similar to that set forth in Example 1, a series of copolymers of vinylidene chloride and vinyl cyanide were prepared, analysis showing the finished copolymers to contain from 5 to 95 per cent vinylidene chloride and conversely from 95 to 5 per cent of vinyl cyanide. Various properties of each sample were tested 24 hours after the copolymer had been preformed into test samples by a simple molding operation. Each of the values reported is an average of several determinations on the same or companion samples. Impact strength, expressed in inch pounds, is given as a measure of toughness of the product. Shore hardness, which is a measure of a combination of hardness, resilience and elasticity, and standard superficial Rockwell hardness, using a 0.5 inch diameter steel ball, are both reported. Tensile strength is given in terms of pounds load per square inch of original cross-sectional area required to rupture a test specimen. Dielectric constant is reported as determined in the usual manner.

| Sample No. | Vinyl cyanide, percent | Impact | Dielectric constant | Tensile strength | Shore hardness | Rockwell hardness |
|---|---|---|---|---|---|---|
| 1 | 5 | 3.1 | 3.95 | 4,200 | 48 | 70 |
| 2 | 10 | 2.7 | 3.24 | 3,600 | 51 | |
| 3 | 15 | 2.5 | 2.61 | 4,700 | 71 | 56 |
| 4 | 20 | 3.2 | 3.2 | 6,800 | | 83 |
| 5 | 25 | 3.4 | 3.17 | 10,500 | 87 | 94 |
| 6 | 25 | 2.4 | 3.16 | 9,900 | 88 | 95 |
| 7 | 30 | | 2.11 | 9,600 | 83 | 88 |
| 8 | 50 | 2.4 | 3.68 | 10,100 | | 94 |
| 9 | 75 | | | | | 96 |
| 10 | 95 | 1.7 | | | | 95 |

*Example 3*

Tests similar to those reported in Example 2 were carried out on several samples of vinylidene chloride-vinyl cyanide copolymers one week after molding the test specimens.

| Sample No. | Vinyl cyanide, percent | Impact | Dielectric constant | Tensile strength | Shore hardness | Rockwell hardness |
|---|---|---|---|---|---|---|
| 11 | 5 | 2.4 | 3.95 | 4,700 | 48 | 83 |
| 12 | 10 | 2.5 | 3.55 | 4,000 | 53 | |
| 13 | 15 | 2.4 | 3.05 | 4,300 | 62 | |
| 14 | 20 | 3.5 | 3.31 | 9,000 | 65 | 87 |
| 15 | 25 | 2.6 | 3.09 | 10,200 | 68 | 93 |
| 16 | 30 | 3.2 | 3.35 | 8,100 | | 96 |

It is observed from the data set forth in the examples that the copolymers of vinylidene chloride and vinyl cyanide have a remarkable combination of properties, each one possessing a high value for at least two of the properties of toughness, hardness, dielectric strength and tensile strength, especially if considered in comparison with other polymeric plastics, including many of the copolymers of vinylidene chloride with compounds other than vinyl cyanide. These properties, together with that of lowered softening point makes these copolymers especially advantageous in preparing molded and extruded shaped articles.

The invention has been illustrated with respect to copolymers of vinylidene chloride and vinyl cyanide. Similarly advantageous properties may be obtained in the copolymers of vinylidene chloride and the alpha-lower alkyl derivatives of vinyl cyanide, examples of which are alpha-methyl vinyl cyanide, alpha-ethyl vinyl cyanide, alpha-butyl vinyl cyanide and alpha-amyl vinyl cyanide.

The copolymers of the invention may be modified as to properties by the inclusion of plasticizers, pigments, dyes or fillers, before or after polymerization, depending on the effect these materials have on the polymerization of the mixed monomers and on the effect desired.

We claim:

1. A copolymer of from 5 to 95 per cent of vinylidene chloride and correspondingly from 95 to 5 per cent of a compound having the general formula

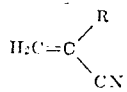

wherein R is selected from the class consisting of hydrogen and the lower alkyl radicals containing from 1 to 5 carbon atoms inclusive.

2. A copolymer of from 5 to 95 per cent of vinylidene chloride and correspondingly from 95 to 5 per cent of vinyl cyanide.

3. A copolymer of from 5 to 95 per cent of vinylidene chloride and correspondingly from 95 to 5 per cent of an alpha-lower alkyl derivative of vinyl cyanide, wherein the lower alkyl group contains from 1 to 5 carbon atoms inclusive.

4. A copolymer of vinylidene chloride and a compound having the general formula

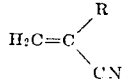

wherein R is selected from the class consisting of hydrogen and the lower alkyl radicals containing from 1 to 5 carbon atoms inclusive.

5. A copolymer of vinylidene chloride and vinyl cyanide.

ALDEN W. HANSON.
WILLIAM C. GOGGIN.